D. C. BACON.
CORN-PLANTER.
No. 189,173. Patented April 3, 1877.
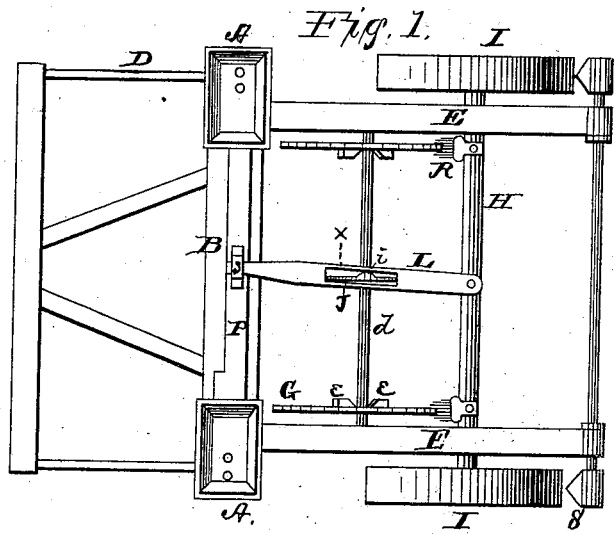
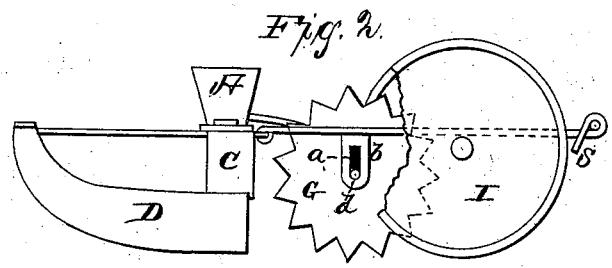
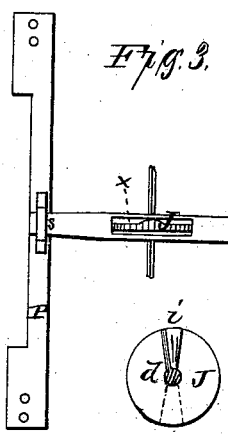
WITNESSES
INVENTOR
D. C. Bacon
ATTORNEYS.

UNITED STATES PATENT OFFICE.

DENNIS C. BACON, OF LITCHFIELD, ILLINOIS.

IMPROVEMENT IN CORN-PLANTERS.

Specification forming part of Letters Patent No. 189,173, dated April 3, 1877; application filed February 8, 1877.

*To all whom it may concern:*

Be it known that I, DENNIS C. BACON, of Litchfield, in the county of Montgomery, and in the State of Illinois, have invented certain new and useful Improvements in Corn-Planter; and do hereby declare that the following is a full, clear, and exact description thereof, reference being had to the accompanying drawings, and to the letters of reference marked thereon, making a part of this specification.

My invention relates to corn-planters; and it consists in the construction and arrangement of the mechanism for operating the dropping-slides, as will be hereinafter more fully set forth.

In order to enable others skilled in the art to which my invention appertains to make and use the same, I will now proceed to describe its construction and operation, referring to the annexed drawing, in which—

Figure 1 is a plan view of a corn-planter embodying my invention. Fig. 2 is a side elevation of the same. Figs. 3 and 4 are detailed views of parts of the invention.

A A represent the seed boxes or hoppers, secured on a bar, B, and having the usual conductors C and furrow-openers D. To the bar B are hinged two parallel bars, E E, connected by an axle, H, on the ends of which are placed the wheels I I.

In front of the axle H, from each bar, depends a vertically-slotted hanger, $b$, in which a shaft, $d$, has its bearings, and in each hanger, above the shaft, is placed a rubber cushion, $a$, allowing the shaft to yield to any inequalities in the ground as the wheels G G, secured on said shaft, pass over the same.

The wheels G G are located one near each end of the shaft $d$, inside of the bars E, and they may be either spur-wheels, as shown in Figs. 1 and 2, or spiked wheels, as shown in Fig. 4, so that the wheels will rotate and turn the shaft during the forward movement of the planter.

On the inner side of each wheel G are two projections, $e\ e$, at equal distances from the center, on opposite sides, forming markers to mark the rows.

In the center of the shaft $d$ is secured a circular disk, J, having cams $i\ i$ on opposite sides, and in opposite directions from the center. This disk works in an elongated slot, $x$, in a lever L, the rear end of which is pivoted on top of the axle H, said axle being stationary in the side bars E E. The front end of the lever L is inserted in a loop or staple, $s$, attached in the center of a slide, P, which rests upon the bar B, and has its ends passing through the seed-boxes A A, and provided with suitable holes for dropping the seed.

As the machine moves forward the wheels G, catching in the ground, rotate the shaft $d$, and the cams $i$ on the disk J alternately vibrate the lever L from side to side, giving the slide P a reciprocating motion.

Back of the wheels G are arranged brushes R, to clean the same from any dirt that might adhere to the same; and back of the wheels I are arranged scrapers S for the same purpose.

I do not broadly claim operating the seed-slide by means of a cross-shaft having spurs resting on the ground, and having a central mechanism connecting with the seed-slide, as I am aware that such is not new.

Having thus fully described my invention, what I claim as new, and desire to secure by Letters Patent, is—

The combination of the axle H, having brushes R R, the slotted bar L, having its rear end pivoted to the axle, and its front end connected to the center of the seed-slide P, the cross-shaft $d$, with spur or spiked wheels G G, and the vertically-placed disk on the shaft $d$, and having cams $i\ i$ on opposite sides, all substantially as set forth.

In testimony that I claim the foregoing I have hereunto set my hand this 26th day of January, 1877.

DENNIS C. BACON.

Witnesses:
F. M. MILES,
GEO. W. PUTNAM.